United States Patent [19]

Shikama et al.

[11] Patent Number: 4,983,002
[45] Date of Patent: Jan. 8, 1991

[54] OPTICAL HEAD DEVICE

[75] Inventors: Shinsuke Shikama; Eiichi Toide, both of Nagaokakyo, Japan

[73] Assignee: Mitsubishi Denki Kabushiki Kaisha, Tokyo, Japan

[21] Appl. No.: 253,584
[22] Filed: Oct. 5, 1988

[30] Foreign Application Priority Data

Oct. 6, 1987 [JP] Japan .................. 62-252000

[51] Int. Cl.$^5$ ............... G02B 5/18; G11B 7/00
[52] U.S. Cl. ................. 350/3.6; 350/162.17; 350/162.2; 369/44.11; 369/109
[58] Field of Search ............ 350/162.17, 3.6, 3.61, 350/162.18, 162.2; 369/109, 44, 45

[56] References Cited

U.S. PATENT DOCUMENTS

| | | | |
|---|---|---|---|
| 4,481,620 | 11/1984 | Murakami | 369/109 |
| 4,501,439 | 2/1985 | Antes | 283/904 |
| 4,753,513 | 6/1988 | Shikama | 369/109 |
| 4,817,072 | 3/1989 | Toide et al. | 369/109 |

FOREIGN PATENT DOCUMENTS 55-101922 8/1980 Japan .
61-151844 7/1986 Japan .

Primary Examiner—Bruce Y. Arnold
Assistant Examiner—Martin Lerner

[57] ABSTRACT

An optical head device which consists of a semiconductor laser for emitting a light flux, a plano-parallel optical element operable to diffract the light flux into a zero-order diffracted light beam and a plurality of diffracted light beams, a condenser lens for converging the diffracted light beams on an information bearing surface of an optical disc to form respective light spots thereon, and a photo-electric detector assembly adapted to receive, and convert into electric signals, the light beams which have been reflected from the information bearing surface of the optical disc and then passed through the optical element via the condenser lens. The plano-parallel optical element of unique construction which is employed is effective to reduce the ratio of intensity of the positive and negative first-order transmitted and diffracted light beams relative to the intensity of the zero-order transmitted and diffracted light beam to a considerably small value and also to provide a favorable tracking sensor output characteristic.

17 Claims, 8 Drawing Sheets

| Zero-order Beam | ---- | F M E |
| Positive First-order Beam | ---- | F₁ M₁ E₁ |
| Negative First-order Beam | ---- | F₋₁ M₋₁ E₋₁ |

OPTICAL HEAD DEVICE

BACKGROUND OF THE INVENTION

1. Field of the Invention

The present invention relates to an optical head device used for recording and/or reproducing information on and from an optical information storage medium such as an optical disc, respectively, and, more particularly, to a three-beam type optical device utilizing three light spots that are converged on the optical information storage medium to record or reproduce the information through one of the light spots and, at the same time, to detect the deviation of the recording/reproducing light spot from the center of an information track using the other two light spots.

2. Description of the Prior Art

An optical videodisc player is well known which operates to read a frequency modulated video and/or audio signal stored in the form of successively positioned depressed area, or "pits", on a plurality of concentric information tracks or a spiral information track carried by a video disc. The optical videodisc player employs an optical head system for directing a reading beam to impinge upon the information track and for gathering the reflected light modulated by the presence and absence of the pits on the information track. The optical videodisc player having an information recording capability in addition to the information reading capability is also well known.

An example of the prior art optical head system employed in the optical videodisc player is illustrated in FIG. 4(a), 4(b) and 4(c). Referring first to FIGS. 4(a) and 4(b) for the discussion of the prior art optical system, the system shown therein comprises a laser 1 employed in the form of a semiconductor laser, a plane-parallel optical element or beam splitter 40a having one of its opposite surfaces (the surface shown by 30) formed with a diffraction grating 30a adapted to diffract a light flux 2, emitted from the laser 1, to produce three diffracted light beams, and a condenser lens 5 for converging the diffracted light beams onto the information bearing surface of an optical disc 6 which has a series of successively positioned pits 7 formed in an information track 8 on that information bearing surface in the optical disc 6. The information track 8 on the information bearing surface of the optical disc 6 is in the form of, for example, a spiral groove of about 0.5 micrometers in width and 1.6 micrometer in pitch between the neighboring convolutions of the spiral groove. Information recorded on the optical disc 6 can be read out by directing a light spot 9 to impinge upon the information track, while the optical disc is rotated at a predetermined speed relative to the optical system and for gathering the reflected light modulated by the presence and absence of the pits on the information track.

The reflected light modulated by the presence and absence of the pits on the information track in the optical disc 6 can be detected, and converted into an electric signal, by a photo-detector assembly 10 after the reflected light has passed through the condenser lens 5 and then through the plano-parallel optical element 40a, and the electrical signal from the photo-detector assembly 10 is in turn supplied to subtractors 12 and 13 and an adder 16 shown in FIG. 4(b).

While the prior art optical head system is so constructed as hereinabove described, it operates in the following manner.

The light flux 2 emitted from the laser 1 is diffracted by the diffraction grating 30a, formed on the surface 30 of the plano-parallel optical element 40a, into the three light beams which are subsequently condensed by the condenser lens 5 so as to converge on the information bearing surface of the optical disc 6 thereby to form three light spots 9a, 9e and 9f as shown by respective hatched circles in FIG. 4(c). The optical head system is so designed and so positioned relative to the optical disc 6 that these light spots 9a, 9e and 9f can be lined up in a row inclined at a predetermined angle relative to the lengthwise direction of the invention track 8 as best shown in FIG. 4(c). In practice, the light spot 9a is used for actual information reading whereas the other light spots 9e and 9f are used for monitoring the position of the light spot 9a for the ultimate purpose of tracking error correction.

Rays of light reflected from the information bearing surface of the optical disc 6 are then passed back through the condenser lens 5 and also through the plano-parallel optical element 40a disposed at a predetermined angle of inclination required to direct the incoming light flux 2 towards the optical disc 6. The light rays having passed through the plano-parallel optical element 40a are imparted astigmatism such that separate line foci can be formed relative to the meridional light beam and the sagittal light beam as is well known to those skilled in the art, and are then projected onto the photo-detector assembly 10 as detected light spots 11a, 11e and 11f.

The photo-detector assembly 10 is so arranged and so positioning in such direction of optical axis that the zero-order diffracted light beam, that is, a primary one (corresponding to the light spot 9a) of the diffracted light beams reflected from the information bearing surface of the optical disc 6 and used for actual information reading, can form a circle of least confusion when the light spot 9a of the zero-order diffracted light beam is focused on the information track 8 on the optical disc 6. The photo-detector assembly 10 is of a construction wherein, as best shown in FIG. 4(b), the three reflected light beams can be detected at six different detecting areas. More specifically, the photo-detector assembly 10 comprises a four-segment detector divided into pairs of detector segments 10a and 10c, 10b and 10d adapted to monitor the zero-order light beam, and separate auxiliary detectors 10e and 10f positioned on respective sides of the four-segment detector and adapted to monitor the others of the diffracted light beams, that is, positive and negative first-order light beams.

As is well known to those skilled in the art, deviation of the light spot 9a from the information track 8 can be detected by calculating, with the use of the subtractor 13, the difference between respective outputs from the auxiliary detectors 10e and 10f. An output from the subtractor 13 is indicative of the occurrence of a tracking error and is, therefore, a tracking error signal which subsequently appears at an output terminal 14. This tracking error signal is in turn utilized to drive a tracking actuator (not shown) for brining the light spot 9a to the right position, where it is aligned with the information track 8, thereby to accomplish a tracking error correction.

The subtractor 12 is utilized to detect the difference between outputs from the paired detector segments 10a and 10c and the paired detector segments 10b and 10d to ascertain a focused condition of the light spot 9a on the information track 8. An output from the subtractor 12 which subsequently appears at an output terminal 15 is indicative of whether or not the light spot 9a is correctly focused on the information track 8 and, in the event that the light spot 9a is not correctly focused, that is, defocused, the output from the subtractor 12 is used to drive a focusing actuator (not shown) to bring the light spot 9a in a properly focused condition.

The detection of a deviation of the focal point is based on an astigmatic method. Specifically, when and so long as the light spot 9a projected onto the information bearing surface of the optical disc 6 is correctly focused, the detected light spot 11a on the detector segments 10a to 10d represents a circle of least confusion as shown in FIG. 4(b) and, therefore, a substantially circular shape. However, when a defocused condition occurs as a result of deviation in distance between the optical head system and the optical disc 6, the light spot 9a projected onto the information bearing surface of the optical disc 6 is deformed to render the detected light spot 11a to represent a generally elliptical shape. Accordingly, the actual defocused condition can be detected by electrically detecting the deformation of the light spot 11a.

The adder 16 operable to sum the outputs from the paired detector segments 10a and 10c, 10b and 10d of the four-segment detector together is utilized to reproduce the information recorded on the information track 8 in the optical disc 6, an output signal from such adder 16 being subsequently supplied to a well known signal processing circuit (not shown) for the eventual reproduction of the information.

The prior art optical head system has been found to have a problem associated with the information reproducibility. More specifically, an undesirable phenomenon which eventually adversely affects the information reproducibility tends to occur in view of the fact that the light beams, reflected from the information bearing surface of the optical disc 6 and traveling towards the photo-detector assembly 10, are diffracted during their passage through the plano-parallel optical element 40a. This problem resulting from the reflected light beams diffracted during the passage through the plano-parallel optical element 40a will now be discussed.

FIG. 5 illustrates a schematic diagram of the prior art optical head system shown in FIG. 4. In FIG. 5, reference characters e, m and f represents the negative first-order reflected and diffracted light beam, the zero-order reflected and diffracted light beam and the positive first-order reflected and diffracted light beam, respectively, all having been projected onto the information bearing surface of the optical disc 6.

The light beams reflected from the information bearing surface of the optical disc 6 are, after having passed through the plano-parallel optical element 40a, directed towards the photo-detector assembly 10 upon which they are incident as zero-order transmitted light beams E, M and F. However, in practice, during the passage through the plano-parallel optical element 40a, the reflected light beams are again diffracted to provide negative and positive first-order transmitted and diffracted light beams. In FIG. 5, the positive first-order transmitted and diffracted light beams are designed by $E_1$, $M_1$ and $F_1$, and the negative first-order transmitted and diffracted light beams are designated by $E_{-1}$, $M_{-1}$ and $F_{-1}$.

$E_{\pm 1}$ represents positive and negative first-order diffracted light beams resulting from the light spot e on the information bearing surface of the optical disc 6; $M_{\pm 1}$ represents positive and negative first-order diffracted light beams resulting from the light spot m; and $F_{\pm 1}$ represent positive and negative first-order diffracted light beams resulting from the light spot f. In FIG. 5, the light beams which ought to be incident upon the photo-detector assembly 10 should be the reflected light beams E, M and F, and these reflected light beams are projected onto the detector segments 10e, 10a to 10d and the detector 10f. However, of the positive and negative first-order transmitted and diffracted light beams resulting from the diffraction having taken place during the passage through the plano-parallel optical element 40a, the light beam $M_{-1}$ overlaps with the light beam E, the light beams $E_1$ and Fhd −1 overlap with the light beam M, and the light beam $M_1$ overlaps with the light beam F, before they are received by the photo-detector assembly 10. Because these overlapped light beams are received by the photo-detector assembly 10 as hereinabove described, characteristics of the detection of the tracking error signal tend to be disturbed. This phenomenon will be discussed in detail with particular reference to FIG. 6 in which the optical disc 6 is shown as inclined at a minute angle $\theta$ relative to the position thereof shown in FIG. 5, have been pivoted about the point m at which the diffracted light beam is converged.

In the condition shown in FIG. 6, the light spot e is projected on the image bearing surface of the optical disc 6 at a position a distance $\delta$ e farther away from a reference position of the optical disc 6 shown in FIG. 5 (or as shown by the phantom line 51 in FIG. 6) whereas the light spot f is projected on the image bearing surface of the optical disc 6 at a position a distance δf closer to the reference position of the optical disc 6 shown in FIG. 5. Accordingly, inclination of the optical disc 6 results in that the light spot E which is reflected from the optical disc 6 and subsequently incident upon the photo-detector assembly 10 has a change in phase corresponding to the optical length of 2 δ e, and the light spot F which is reflected from the optical disc 6 and subsequently incident upon the photo-detector assembly 10 has a change in phase corresponding to the optical length of $-2\delta$ f. On the other hand, the light spots $M_1$ and $M_{-1}$ do not have any change in phase because they are reflected from the spot m on the optical disc 6.

As a result thereof, a phase difference occurs between the light beams E and $M_{-1}$ commonly incident upon the detector segment 10e and, therefore, interference occurs therebetween. A similar phase difference occurs between the light beams F and $M_1$ commonly incident upon the detector segment 10f and, therefore, interference occurs therebetween. By these inteferences, the characteristics of detection of the tracking error tend to be disturbed. FIG. 7 illustrates a graph obtained during a simulated calculation to show how output signals from one of the detector segments 10e and 10f are disturbed by the above discussed interferences. During the simulated calculation which led to the results shown in the graph of FIG. 7, the following parameters were employed.

| | |
|---|---|
| Ratio of Intensity of Light Spots on Optical Disc (See FIG. 8) $I_{+1r}/I_{0r}$, $I_{-1r}/I_{0r}$ | 0.2 |
| Average Reflectivity of Optical Disc | 0.8 |
| Modulation Depth of Track Traversing Signal | 0.23 |

-continued

| | |
|---|---|
| Ratio of Intensity of Transmitted and Diffracted Light Beams (See FIG. 8) $I_{+1t}/I_{0t}$, $I_{-1t}/I_{0t}$ | $1.03 \times 10^{-5}$ |

In FIG. 7, a cycle of short variation corresponds to the traverse across the track, and a change in envelope shown by the broken lines corresponds to the inclination of the optical disc 6. As shown, assuming that the amplitude of the track traversing signal and the amplitude of variation of the envelope are expressed by A and B, respectively, the amount of variation of the envelope can be calculated by $(B/A) \times 100\%$. Considering that the tracking control accuracy required in the optical disc is about 0.1 micrometer and the track pitch, that is, the pitch between the neighboring tracks, is about 1.6 micrometer, it is desirable that the amount of change in track detection signal is not greater than about 10%. For this purpose, according to the result of the above discussed simulated calculation, it can be concluded that the ratio of intensity of the transmitted and diffracted light beams (positive and negative first-order/zero-order) must be not greater than $1.03 \times 10^{-5}$.

However, according to the prior art optical head system, such a consideration has not been given attention to in designing and constructing the plano-parallel optical element 40a and, therefore, such a small ratio of intensity of the transmitted and diffracted light beams cannot be attained. This in turn brings about such a problem that the envelope of the tracking error signal tends to change beyond the tolerance.

For example, in the Japanese Laid-Open Patent Publication No. 61-151844 showing a typical prior art optical head system, no consideration is given to the problem associated with lowering the ratio of intensity of the transmitted and diffracted light beams.

In Japanese Laid-Open Patent Publication No. 55-101922 which pertains to a light beam divider for use in a photographic camera, not an optical head system, a technique to lower that ratio is disclosed. However, because the technique disclosed therein requires the formation over a substrate of a number of layers such as a reflection layer, and adhesive layer and an over-coated layer, the structure of the divider tends to be complicated.

SUMMARY OF THE INVENTION

The present invention has been devised with the aim at substantially eliminating the problems inherent in the prior art optical head system and is intended to provide an improved optical head device employing a plano-parallel optical element of a type effective to reduce the ratio of intensity of the positive and negative first-order transmitted and diffracted light beams relative to the intensity of the zero-order transmitted and diffracted light beam to a considerably small value and also to provide a favorable tracking sensor output characteristic.

In order to accomplish the above described object of the present invention, there is provided an optical head device which employs a unique plano-parallel optical element of the following construction.

(1) A periodic structure (grating) made of a medium having an index of refraction n2 is formed on a flat substrate.

(2) A half-mirror layer is formed over the flat substrate having the grating for securing a predetermined reflectivity and a predetermined transmissivity.

(3) An over-coated layer having a flat surface and also having an index of refraction n1 is formed on the half-mirror layer.

(4) The difference between the indices of refraction, expressed by $|n1-n2|$, is so selected that the amount of phase shift of transmission diffraction of the diffraction grating on the plano-parallel optical element determined by the index of refraction n2 of the material for the grating and the index of refraction n1 of the over-coated layer can be of a value not greater than a predetermined amount.

(5) The maximum limit for the film thickness of the over-coated layer is determined in consideration of the fact that the astigmatism occurring in light beams emitted from the laser and subsequently reflected from the half-mirror layer can be rendered to be of a value so small as to be negligible.

In the optical head device embodying the present invention, since the amount of the transmission phase shift resulting from the difference in index of refraction between the grating in the plano-parallel optical element and the over-coated layer is so selected as to be not greater than the predetermined value, the ratio of intensity of the positive and negative first-order transmitted and diffracted light beams relative to the intensity of the zero-order transmitted and diffracted light beam can be reduced to a value not greater than a predetermined value. Therefore, the optical head device can be realized wherein an output indicative of the detection of a tracking error, which output has a minimized variation in envelope relative to the inclination of the optical disc, can be obtained.

Moreover, since the over-coated layer in the plano-parallel optical element is so designed as to have a film thickness not greater than the predetermined value, there is no possibility that astigmatism can be formed in the light beams converged on the optical disc and, accordingly, the light converging characteristic will not be degraded.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

DETAILED DESCRIPTION OF THE EMBODIMENTS

Figure 1A:
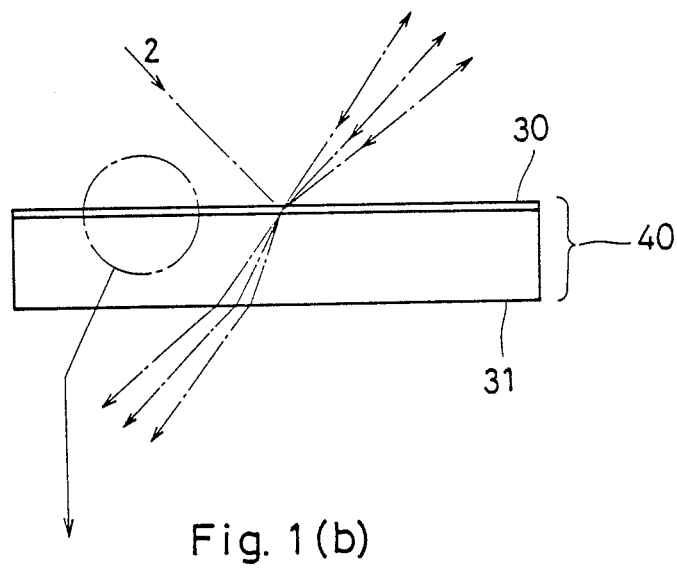
FIG. 1(a) is a schematic diagram showing a plano-parallel optical element according to a first preferred embodiment of the present invention.
Figure 1B:
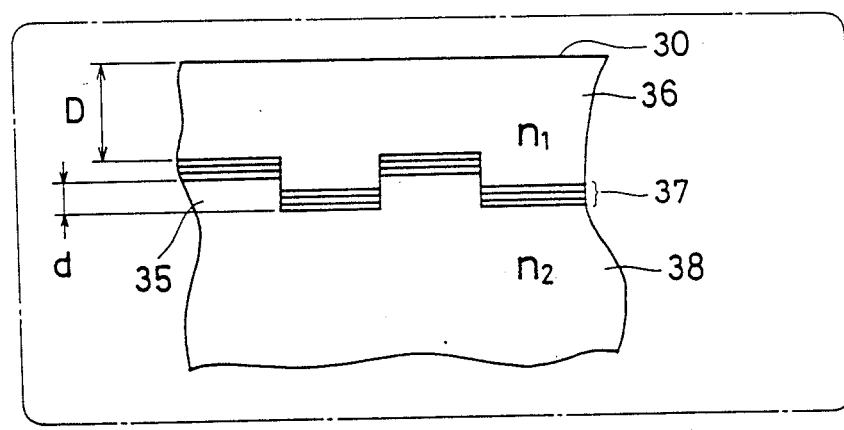
FIG. 1(b) is an enlarged representation of that portion of the plano-parallel optical element which is indicated by a circle in FIG. 1(a)

Referring first to FIG. 1(a) and 1(b), there is schematically illustrated the plano-parallel optical element 40 according to a first preferred embodiment of the present invention. Reference numeral 30 represents the surface under which a diffraction grating is formed, and reference numeral 31 represents the opposite surface confronting the photo-detector assembly 10 which has been shown in and described with reference to FIG. 4 in connection with the prior art optical system.

The details of the plano-parallel optical element 40 shown in FIG. 1(a) are best shown in FIG. 1(b) which is an enlarged representation of a portion thereof indicated by the circle in FIG. 1(a). As best shown in FIG. 1(b), the plano-parallel optical element 40 comprises a flat substrate 38 having a generally rectangular periodic structure (diffraction grating) 35 formed on and integrated together with the substrate 38, said periodic structure having an index of refraction n2 and a thickness d. In accordance with the present invention, a half-mirror layer 37 is formed on the substrate 38 and the grating 35, which layer 37 is in turn covered by an over-coated layer 36 overlaying the half-mirror layer 37. The over-coated layer 36 has a flat smooth surface opposite to the half-mirror layer 37 and also has an index of refraction n1 and a thickness D.

Figure 4A:
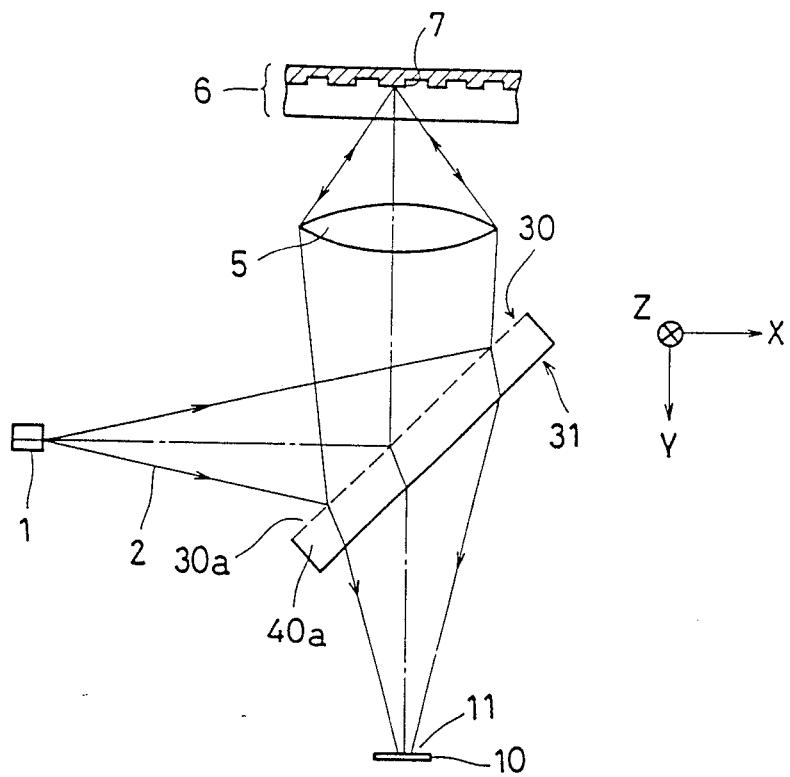
FIG. 4(a) is a schematic diagram showing an optical system in the prior art optical head system.
Figure 4B:
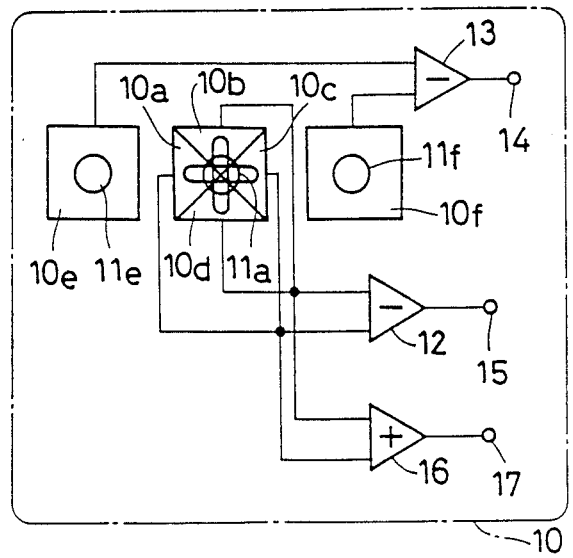
FIG. 4(b) is a schematic circuit representation showing a detector circuit used in the prior art optical head system.
Figure 4C:
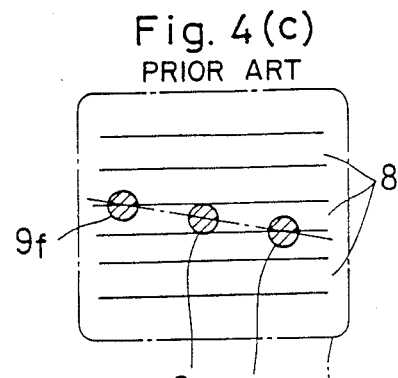
FIG. 4(c) is a schematic diagram showing the manner in which light spots are formed on an information bearing surface of the optical disc.
Figure 5:
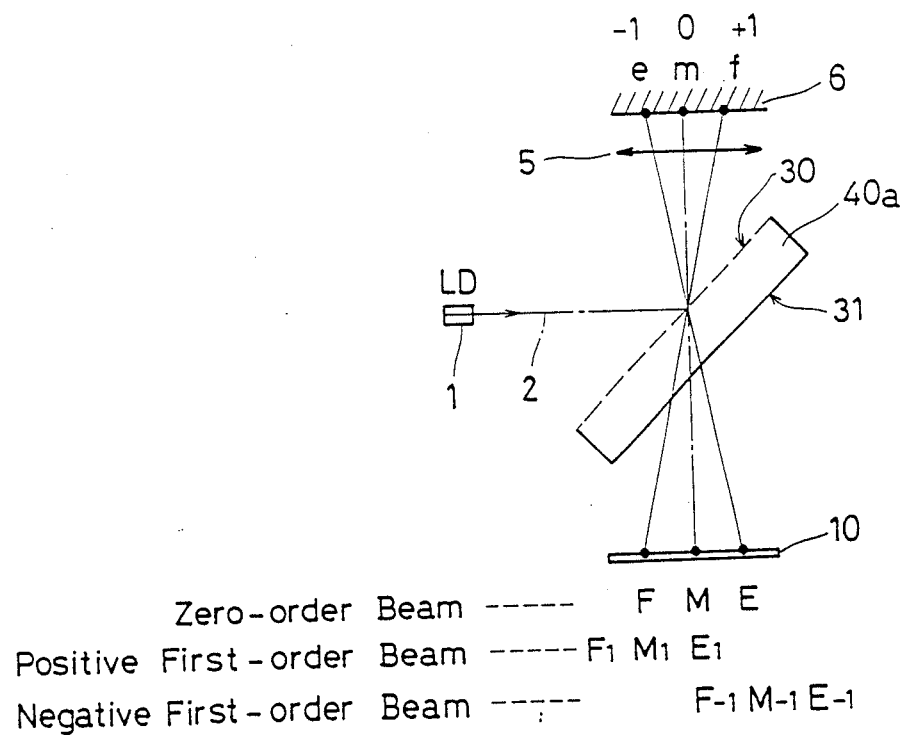
FIG. 5 is a schematic diagram used to explain how transmitted and diffrated light beams are produced on the detector assembly in the prior art optical head system.
Figure 6:
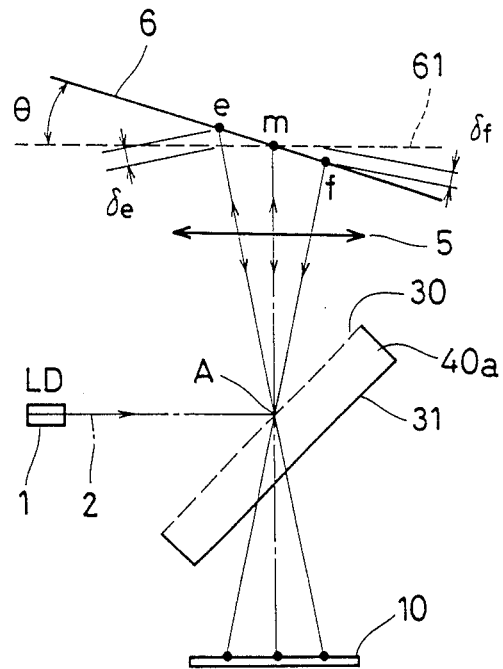
FIG. 6 is a diagram similar to FIG. 5, showing the optical disc inclined relative to the position thereof shown in FIG. 5.
Figure 7:
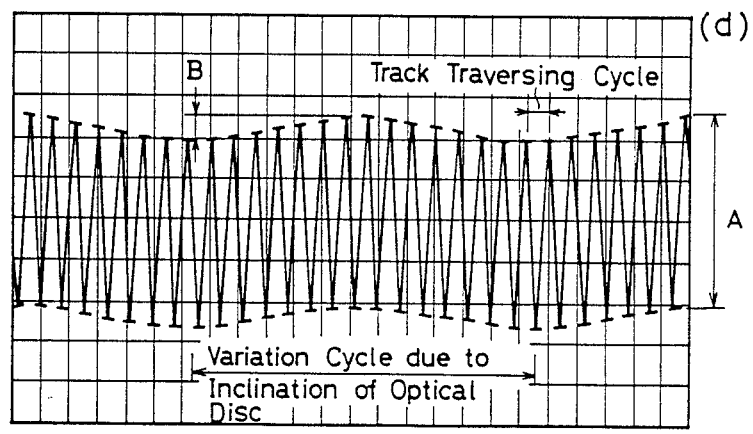
FIG. 7 is a graph showing results of the simulated calculation conducted to determine characteristics of track detection outputs obtained from the detectors in the prior art optical head system.
Figure 8:
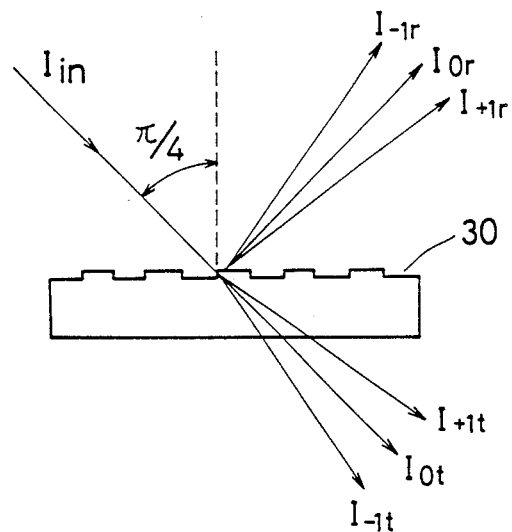
FIG. 8 is a diagram used to explain the reflection diffraction and the transmission diffraction.

The plano-parallel optical element 40 for use in the optical head device according to the present invention operates in the following manner. A flux of light 2 emitted from the laser, which may be of any known construction such as shown in FIG. 4 and which is projected onto the surface 30 of the plano-parallel optical element 40 at an angle of inclination relative thereto, is reflected by the half-mirror layer 37 having surface irregularities complemental in shape to the diffraction grating 35 forming, for example, the fine parallel grooves or curved grooves, thereby providing reflected and diffracted light beams (zero-order and positive and negative first-order light beams) which travel toward an objective lens assembly (not shown) and then towards the optical disc. Light beams reflected back from the optical disc are again projected onto the surface 30 of the plano-parallel optical element 40 and are partially transmitted therethrough by the half-mirror layer 37.

The ratio of the intensity of the positive and negative first-order transmitted and diffracted light beams relative to the intensity of the zero-order transmitted and diffracted light beam will now be discussed.

Figure 9:
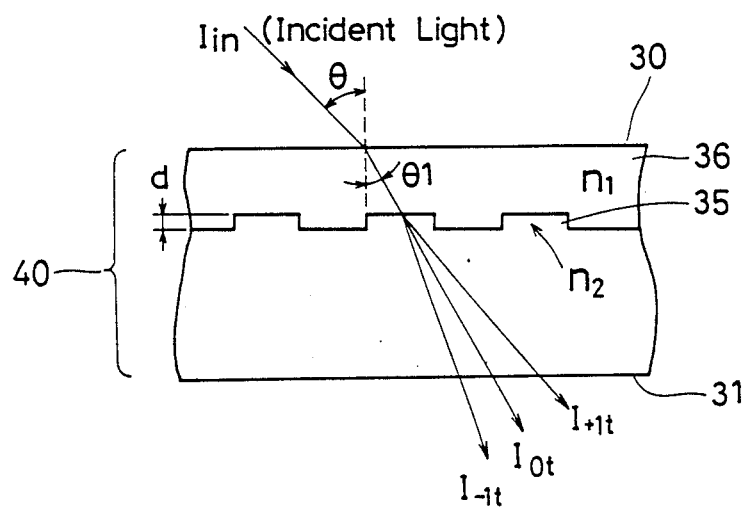
FIG. 9 is a diagram used to explain the transmitted diffraction occurring in the plano-parallel optical element having an over-coated layer formed thereon.

Let it be assumed that, as shown in FIG. 9, the incident light impinges upon the surface 30 of the plano-parallel optical element 40 at an angle of incidence $\theta$, then refracted at an angle of refraction $\theta 1$ by the over-coated layer 36, and finally diffracted by the diffraction grating 35 into light fluxes having respective light intensities $I_{0t}$, $I_{+1t}$ and $I_{-1t}$ during the transmission thereof through the plano-parallel optical element 40. If the absolute value of the difference between the indices of refraction n1 and n2 is far smaller than 1, the amount of phase shift $\psi_T$ as a phase-type diffraction grating relative to the transmitted light can be given by the following equation.

$$\Psi_T \approx [2\pi d(n1-n2)]/\lambda \cos \theta 1$$

On the other hand, assuming that the duty ratio of the periodic structure of the diffraction grating 35 is 0.5, the ratio of the intensity of the positive and negative first-order transmitted and diffracted light beams relative to the intensity of the zero-order transmitted and diffracted light beam, which ratio is hereinafter referred to as "±1st order/0-order intensity ratio", can be given by the following equation.

$$(I_{\pm 1t}/I_{0t}) = [2 \tan(\psi_T/2)/\pi]^2 \qquad (2)$$

From the equations (1) and (2) above, it is clear that, in order to minimize the value $(I_{\pm 1t}/I_{0t})$, the value $\psi_T$ should be as small as zero.

The following example, which is not intended to limit the present invention, but is set forth only for the purpose of illustration of the present invention, shows the manner in which particular values are chosen for the various parameters.

EXAMPLE

Assuming that any one of the substrate 38, the diffraction grating 35 and the over-coated layer 36 are made of polymethyl methacrylate (PMMA) resin and that the angle of incidence $\theta$ is chosen to be 45°, the index of refraction n1 is 1.48 and the angle of refraction $\theta 1$ is about 28.5°. From the equation (1), we will obtain:

$$\psi_T \approx 7.15 \times [d(n1-n2)]/\lambda \qquad (1A)$$

Considering that the tolerance of variation of the envelope of the tracking error signal is 10%, as described above, the result would be $(I_{\pm 1t}/I_{0t}) \leq 1.03 \times 10^{-5}$, which will, when inserted in the equation (2), give the following result.

$$|\psi_T| \leq 1.010 \times 10^{-2} \, (rad) \qquad (3)$$

Using the equations (3) and (1A), the following result can be obtained.

$$d \cdot |n1 - n2|/\lambda \leq 1.41 \times 10^{-3} \quad (4)$$

Also, considering that the representative wavelength of the laser light emitted from the laser generally used in the optical head system is $\lambda = 0.78$ micrometers and that the thickness d of the diffraction grating is chosen to be 0.058 micrometer for the purpose of imparting an appropriate value to the intensity of light of the positive and negative first-order reflected and diffracted light beams relative to the intensity of light of the zero-order reflected and diffracted light beam ($I_{\pm 1r}/I_{0r}$) in the application of the three-beam optical head system, the following result can be obtained in view of the equation (4).

$$|n1 - n2| \leq 1.9 \times 10^{-2} \quad (5)$$

By the above discussed method of calculation, and by modifying the equation (4) as expressed by the equation (5) to limit the indices of refraction n1 and n2, the ±1st-order/0-order intensity ratio ($I_{\pm 1t}/I_{0t}$) can be controlled to a value not greater than the predetermined intensity ratio.

Hereinafter, a method of making the plano-parallel optical element 40 shown in FIG. 1 according to the present invention will be described.

The substrate 38 for the plano-parallel optical element 40 can be prepared accordingly to any one of the following methods.

(1) The diffraction grating 35 is formed on one surface of a flat plate glass (substrate) by the use of any suitable means such as, for example, an etching technique.

(2) Transparent synthetic resin is molded by the use of any suitable plastics molding technique such as, for example, an injection molding technique to form the substrate 38 having the diffraction grating 35 as molded.

(3) The substrate 38 having the diffraction grating 35 formed on one surface thereof is molded by the use of a UV-curable synthetic resin. In this connection, a molding method known as a 2P method can be employed (See H. C. Haverkorn et al., Philips Tech. Rev. 40, 10, p. 290).

The half-mirror layer 37 is employed to render the ratio of transmissivity of the incident light relative to the reflectivity of the incident light to be, for example, 0.5 to 0.5 and may be made in the form of a single foil to metal, a multilayer of dielectric material or a mixed multilayer of metal and dielectric material. In practice, either a vapor-deposition technique or a sputtering technique may be employed to form the half-mirror layer 37.

The over-coated layer 36 is provided for rendering the surface 30 to be flat and is formed of any suitable material such as synthetic resin. The formation of the over-coated layer 36 is preferably carried out by the use of a spin-coating technique.

During the manufacture of the plano-parallel optical element 40, care must be taken in selecting the material having such an index of refraction that the index of refraction n2 of the diffraction grating and the index of refraction n1 of the over-coated layer can satisfy the requirements expressed by the equation (3) as closely as possible.

By way of example, if the substrate 38 is formed by the use of the 2P method and the over-coated layer 36 is formed by the suitable means, for example, the spin-coating technique, with the use of the same UV-curable synthetic resin as used during the 2P method, the indices of refraction n1 and n2 can approximate with each other and, therefore, the ±1st-order/0-order intensity ratio can be advantageously minimized.

Hereinafter, the selection of the film thickness of the over-coated layer 36 will be discussed. In view of the fact that the incoming light flux 2 emitted from the laser and impinging upon the plano-parallel optical element 40 is diverging light and the over-coated layer 36 can be considered as a plano-parallel plate inclined at an angle of inclination $\theta$, the reflected light beams result in such an astigmatic aberration (rms value) as expressed by the following equation (6).

$$\text{rms value} = [2D(n1^2 - 1)\theta^2/(4\sqrt{6}\ n1^3 \lambda] \cdot Na^2 \quad (6)$$

wherein $\lambda$ represents the wavelength of light and Na represents a numerical aperture of the incoming light emitted from the laser.

It is well known that, in the event that the astigmatic aberration occurs in the reflected and diffracted light beams, the respective shapes of the light spots projected on the image bearing surface of the optical disc 6 will deform accompanied by reduction in reproducibility of information from the optical disc.

In view of the foregoing, if the tolerance of astigmatic aberration is $0.01\lambda$ rms, the parameter Na is 0.1, the wavelength $\lambda$ is 0.78 micrometers, the angle $\theta$ is $\pi/4$ and the index of refraction n1 is 1.48, the equation (6) above results in $D \leq 16.9$ micrometers.

In this way, by determining the maximum limit of the thickness D of over-coated layer 36 in the light of the tolerance of astigmatic aberration and with the use of the equation (6) and by designing the over-coated layer 36 so as to have the thickness not greater than the maximum limit so determined, the aberration of the light spots formed on the information bearing surface of the optical disc can be rendered substantially negligible and, therefore, the optical head system capable of exhibiting a favorable recording/reproducing characteristic can be realized.

The plano-parallel optical element 40 according to the second preferred embodiment of the present invention will now be described with reference to FIGS. 2(a) and 2(b).

Figure 2A:
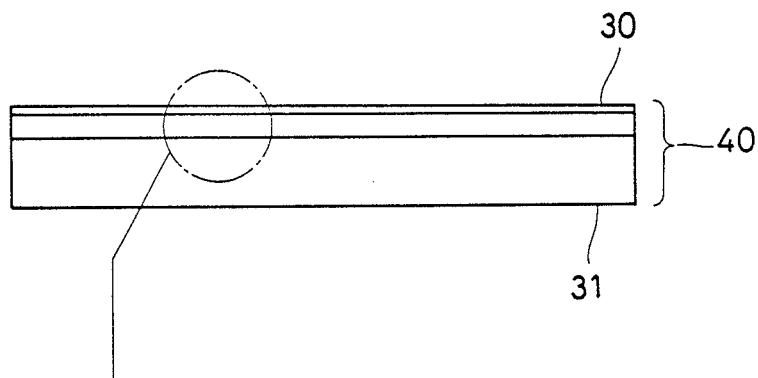
FIG. 2(a) is a schematic diagram showing the plano-parallel optical element according to another preferred embodiment of the present invention.
Figure 2B:
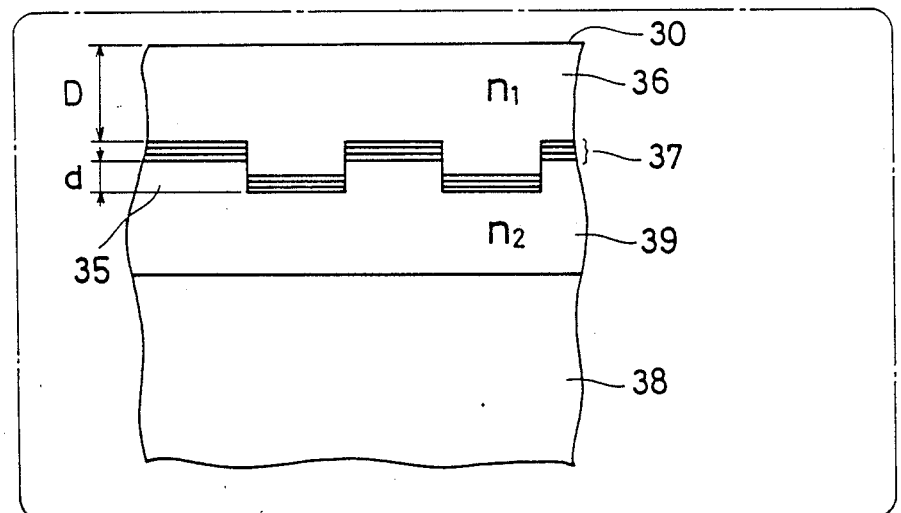
FIG. 2(b) is an enlarged representation of that portion of the plano-parallel optical element which is indicated by a circle in FIG. 2(a)

As best shown in FIG. 2(b) showing an enlarged representation of a portion of the optical element 40 indicated by the circle in FIG. 2(a), the diffraction grating 35 is formed integrally with a grating substrate 39 made of such material as having an index of refraction n2. This grating substrate 39 having the diffraction grating 35 is sandwiched between the over-coated layer 36 and the flat substrate 38 with the half-mirror layer 37 positioned between the diffraction grating 35 and the over-coated layer 36. Except for the use of the grating substrate 39 on which the diffraction grating 35 is integrally formed, the plano-parallel optical element 40 according to the second preferred embodiment of the present invention is similar in structure to the plano-parallel optical element 40 according to the first preferred embodiment thereof.

The plano-parallel optical element 40 according to the second embodiment shown in FIGS. 2(a) and 2(b) may be manufactured in the following manner.

At the outset, a flat plate such as a plate glass is prepared as a material for the substrate 38. Subsequently, the grating substrate 39 having a grating pattern such as a pattern of parallel grooves or curved grooves forming the diffraction grating 35 is formed on one surface of the substrate 38 by the use of the 2P method or any other molding means such as, for example, an injection molding technique. Thereafter, the half-mirror layer 37 is formed by the use of a vapor deposition technique or a sputtering technique, followed by the spin-coating of synthetic resin to form the over-coated layer 36 having the flat surface 30.

According to the second preferred embodiment of the present invention, since the relatively thin grating substrate 39, the half-mirror layer 37 and the over-coated layer 36 can be formed on the relatively thick glass substrate 38, the plano-parallel optical element 40 wherein each of the component layers has a satisfactory flatness can be obtained.

In the plano-parallel optical element according to the second preferred embodiment of the present invention, the selection of indices of refraction n1 and n21, the thickness d of the diffraction grating and the film thickness D of the over-coated layer is identical with that described and shown in connection with the plano-parallel optical element according to the first preferred embodiment of the present invention and, therefore, no description thereof will be reiterated for the sake of brevity.

Figure 3A:
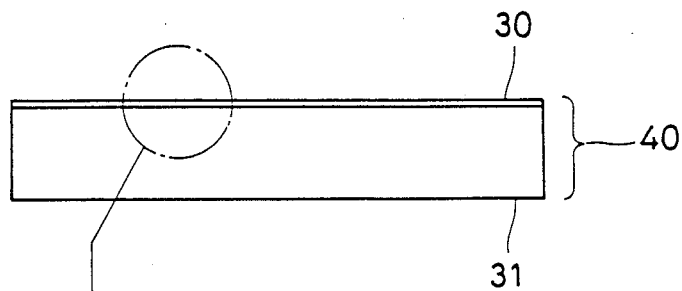
FIG. 3(a) is a schematic diagram showing the plano-parallel optical element according to a further preferred embodiment of the present invention.
Figure 3B:
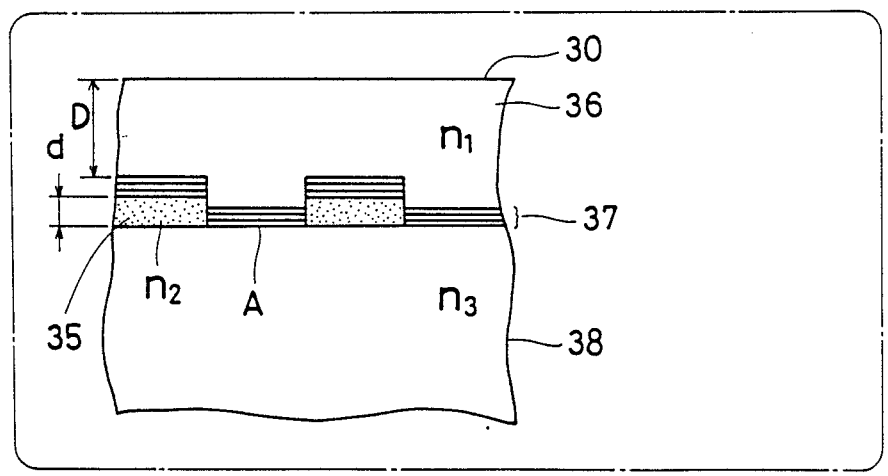
FIG. 3(b) is an enlarged representation of that portion of the plano-parallel optical element which is indicated by a circle in FIG. 3(a)

Shown in FIGS. 3(a) and 3(b) is a plano-parallel optical element 40 according to the third preferred embodiment of the present invention.

In the plano-parallel optical element 40 shown in FIGS. 3(a) and 3(b), the diffraction grating 35 is formed directly on one surface of the flat-surfaced substrate 38 such as a plate glass. To form the diffraction grating 35 directly on the surface of the substrate 38, a method of vapor-deposition of dielectric material followed by a patterning to form a pattern of grooves forming the diffraction grating may be employed. Alternatively, a method may be employed wherein, after a resist layer has been coated on the surface of the substrate 38 by the use of the spin-coating technique, a lithographic patterning technique is employed to form the pattern of grooves forming the diffraction grating.

Subsequent to the formation of the diffraction grating 35 on the glass substrate 38, the half-mirror layer 37 is formed by the use of a vapor deposition technique or a sputtering technique, followed by the formation of the over-coated layer 36 in a manner similar to that hereinbefore described. As is the case with the second preferred embodiment of the present invention, the plano-parallel optical element 40 wherein each of the component layers has a satisfactory flatness can be obtained.

It is, however, to be noted that the index of refraction n3 of the substrate 38 shown in FIG. 3(b) is preferred to be of a value as close to the index of refraction n2 as possible in order to render the half-mirror layer 37 to exhibit the uniform reflectivity and transmissivity in the region over the diffraction grating 35 and in the region indicated by A between the neighboring diffraction gratings.

In this third embodiment of the present invention, in order to render the indices of refraction n1 and n2 to be closer to each other, it can be contemplated to form a pattern of grooves to form the diffraction grating 35 by the use of a lithographic patterning technique using a photo resist and then to form the over-coated layer 36 by means of a spin-coating technique using the same resist as used to form the pattern of the parallel grooves.

In the plano-parallel optical element fabricated according to the present invention, although it has a capability of acting as the diffraction grating with respect to the light beams emitted from the laser and incident upon the plano-parallel optical element, it also has a capability of acting as a single half-mirror, not a diffraction grating, with respect to the light beams transmitted therethrough, the mentioned capability being not found in the prior art grating element or half-mirror element. Accordingly, the plano-parallel optical element according to the present invention can be utilized not only in the optical head system, but also in any optical appliance where such dual capabilities are required.

The present invention having been fully described is featured in the use of the plano-parallel optical element of the following construction in the optical head device.

(1) The periodic structure (diffraction grating) made of a medium having the index of refraction n2 is formed on the flat substrate.

(2) The half-mirror layer is formed over the flat substrate having the diffraction grating for securing the required reflectivity and the required transmissivity.

(3) The over-coated layer having the flat surface and also having the index of refraction n1 is formed on the half-mirror layer.

(4) The difference between the indices of refraction, expressed by $|n1-n2|$, is so selected that the amount of phase shift and diffraction of the diffraction grating on the plano-parallel optical element determined by the index of refraction n2 of the material for the grating and the index of refraction n1 of the over-coated layer can be of a value not greater than a predetermined amount, typically $1.01 \times 10^{-2}$ radians or smaller, thereby rendering the difference $|n1-n2|$ to be not greater than a predetermined value.

(5) The maximum limit for the film thickness of the over-coated layer is determined in consideration of the fact that the astigmatism occurring in light beams emitted from the laser and subsequently reflected from the half-mirror layer can be rendered to be of a sufficiently small value (about $0.01\lambda$ rms or smaller), for example, 16.9 micrometers or smaller.

Because of the use of the unique plano-parallel optical element, the optical head device of the present invention is effective in that the tracking error signal wherein the variation of the envelope thereof resulting from the inclination of the optical disc is advantageously minimized can be obtained. Also, because of the feature (5) listed above, the favorable light spots can be converged on the information bearing surface of the optical disc with no substantial reduction in the recording/reproducing characteristic being accompanied.

Although the present invention has fully been described in connection with the preferred embodiments thereof with reference to the accompanying drawings used only for the purpose of illustration, those skilled in the art will readily conceive numerous changes and modification within the framework of obviousness upon the reading of the specification herein presented of the present invention. Accordingly, such changes and modification are, unless they depart from the spirit and scope of the present invention as delivered from the claims annexed hereto, to be construed as included therein.

What is claimed is:

1. An optical head device comprising:

light source means for emitting a light flux;

plano-parallel optical beam separating means for reflecting said light flux into a zero-order diffracted light beam and a plurality of diffracted light beams onto an optical storage medium; and photo-electric detector means for receiving light beams reflected from said optical storage medium through said plano-parallel optical beam separating means for detecting if light spots are focused properly on said optical storage medium and for providing a read signal indicative of information recorded on said optical storage medium as based upon said zero-order diffracted light beam and for monitoring displacement of said light spots with respect to an information track of said optical storage medium as based upon said plurality of diffracted light beams, said plano-parallel optical beam separating means comprising a flat substrate, a diffraction grating formed on said flat substrate of periodic structure, index of refraction n2, and thickness d, a half-mirror layer formed on said diffraction grating and said flat substrate, and an overcoat layer, having a flat surface, of thickness D and index of refraction n1 formed on said half mirror layer such that an absolute value of phase shift caused by transmission through said diffraction grating and said overcoat layer is not greater than $1.01 \times 10^{-2}$ (radian) so that the ratio of the intensity of positive and negative first order light beams, resulting from transmission diffraction of said light flux, relative to the intensity of a zero-order transmission diffraction light beam is not greater than $1.03 \times 10^{-5}$ to minimize variation of a tracking error signal envelope relative to inclination of said optical storage medium.

2. The optical head device as claimed in claim 1, wherein the difference between the indices of refraction expressed by $|n1-n2|$ is $1.9 \times 10^{-2}$ or smaller.

3. The optical head device as claimed in claim 1, wherein the substrate is a flat glass plate and said diffraction grating is formed directly on one surface of the flat glass plate by the use of an etching technique.

4. The optical head device as claimed in claim 1, wherein the substrate and the diffraction grating are integrally formed by the use of an injection molding technique.

5. The optical head device as claimed in claim 1, wherein the substrate and the diffraction grating are made of UV-curable synthetic resin and formed by molding the UV-curable synthetic resin with the use of a mold assembly.

6. The optical head device as claimed in claim 1, wherein the substrate is a plate glass and the diffraction grating comprises a grating substrate made of UV-curable synthetic resin and having one surface formed with a grating pattern, said grating substrate being formed by molding the UV-curable synthetic resin with the use of a mold assembly, and said grating substrate being deposited on the plate glass.

7. The optical head device as claimed in claim 1, wherein the substrate is a plate glass and the diffraction grating is formed by vapor-depositing or sputtering dielectric material on one surface of the plate glass to form a grating pattern.

8. The optical head device as claimed in claim 1, wherein the substrate is a plate glass and the diffraction grating is formed by forming a resist layer on one surface of the plate glass by the use of a spin-coating technique and then forming a grating pattern by the use of a lithographic patterning technique.

9. The optical head device as claimed in claim 1, wherein the over-coated layer is made of synthetic resin and deposited by the use of a spin-coating technique.

10. The optical head device as claimed in claim 1, wherein both said diffraction grating and said over-coated layer are made of the same material.

11. The optical head device as claimed in claim 1, wherein said thickness D of the over-coated layer is selected such that the rms value of astigmatic aberration produced when said light flux is reflected by said half-mirror layer back towards said light condensing means is about $0.01\lambda$ rms or smaller, wherein $\lambda$ represents the wavelength of light emitted by the laser.

12. The optical head device as claimed in claim 11 wherein said thickness D of the over-coated layer is not greater than 16.9 micrometers.

13. The optical head device as claimed in claim 1, wherein said thickness D of said overcoat layer is selected such that the rms value of astigmatic aberration produced when said light flux is reflected by said half-mirror layer towards said optical storage medium is about $0.01\lambda$ rms or smaller, wherein $\lambda$ represents the wavelength of light emitted by the laser.

14. The optical head device as claimed in claim 1 wherein said thickness D of said overcoat layer is not greater than 16.9 micrometers.

15. An optical head device comprising:

light source means for emitting a light flux;

plano-parallel optical beam separating means for reflecting said light flux into a zero-order diffracted light beam and a plurality of diffracted light beams onto an optical storage medium; and photo-electric detector means for receiving light beams reflected from said optical storage medium through said plano-parallel optical beam separating means for detecting if light spots are focused properly on said optical storage medium and for providing a read signal indicative of information recorded on said optical storage medium as based up said plurality of diffracted light beams and for monitoring displacement of said light spots with respect to an information track of said optical storage medium as based upon said zero-order diffracted light beam, said plano-parallel optical beam separating means comprising a flat substrate, a diffraction grating formed on said flat substrate of periodic structure, index of refraction n2, and thickness d, a half-mirror formed on said diffraction grating and said flat substrate, and an overcoat layer, having a flat surface, of thickness D and index of refraction n1 formed on said half mirror such that the difference between the indices of refraction is less than $1.9 \times 10^{-2}$ so that the ratio of the intensity of positive and negative first order light beams, resulting from diffraction of said light flux, relative to the intensity of said zero-order diffracted light beam is less than $1.03 \times 10^{-5}$ to minimize variation of a tracking error signal envelope relative to inclination of said optical storage medium.

16. The optical head device as claimed in claim 15, wherein said thickness D of said overcoat layer is selected such that the rms value of astigmatic aberration produced when said light flux is reflected by said half-mirror towards said optical storage medium is about 0.01λ rms or smaller, wherein λ represents the wavelength of light emitted by the laser.

17. The optical head device as claimed in claim 16 wherein said thickness D of said overcoat layer is not greater than 16.9 micrometers.

* * * * *